United States Patent [19]

Hartmann

[11] Patent Number: 4,955,627
[45] Date of Patent: Sep. 11, 1990

[54] FIVE SPEED CHAINLESS DRIVE FOR HEAVILY LOADED PEDAL POWERED TRICYCLES

[76] Inventor: Dirck T. Hartmann, 4121 Morning Star Dr., Huntington Beach, Calif. 92648

[21] Appl. No.: 363,874

[22] Filed: Jun. 9, 1989

[51] Int. Cl.$^5$ .......................... B62M 1/08; F16H 3/44
[52] U.S. Cl. .................................. 280/236; 280/238; 280/259; 280/260; 475/283; 475/297; 475/298
[58] Field of Search ............... 280/259, 260, 261, 236, 280/238; 74/750 R, 750 B; 192/6 A

[56] References Cited

U.S. PATENT DOCUMENTS

| | | | |
|---|---|---|---|
| 2,441,989 | 5/1948 | Brown | 74/750 B |
| 4,706,982 | 11/1987 | Hartmann | 280/260 |
| 4,715,246 | 12/1987 | Hartmann | 280/260 |
| 4,721,015 | 1/1988 | Hartmann | 280/260 |

FOREIGN PATENT DOCUMENTS 591678 8/1947 United Kingdom ................ 280/238

Primary Examiner—Charles A. Marmor
Assistant Examiner—Anne Marie Boehler

[57] ABSTRACT

A chainless drive for pedal powered tricycles features a pedal drive shaft located on the axis of the driving wheel and a five speed planetary transmission mounted concentric with the drive shaft and housed within the hub of the wheel. The transmission drives the wheel with a torque which is a multiple of the pedal torque for the two lowest speeds, provides a direct drive for the third speed, and drives the wheel at a multiple of the pedal speed for the two highest speeds. When used as a torque multiplier in the two low speeds, the transmission can drive the wheel either forward or in reverse depending on the direction the pedals are rotated, but permits coasting with the pedals stopped in speeds three, four, and five. A tricycle using this invention with a bin or flatbed should be useful in the factory or on the farm for the transport of parts or produce, or useful as a two passenger taxi with a seat assembly. Because the drive is completely enclosed, it can be operated for extended periods without maintenance even in dusty areas.

6 Claims, 3 Drawing Sheets

FIG 2
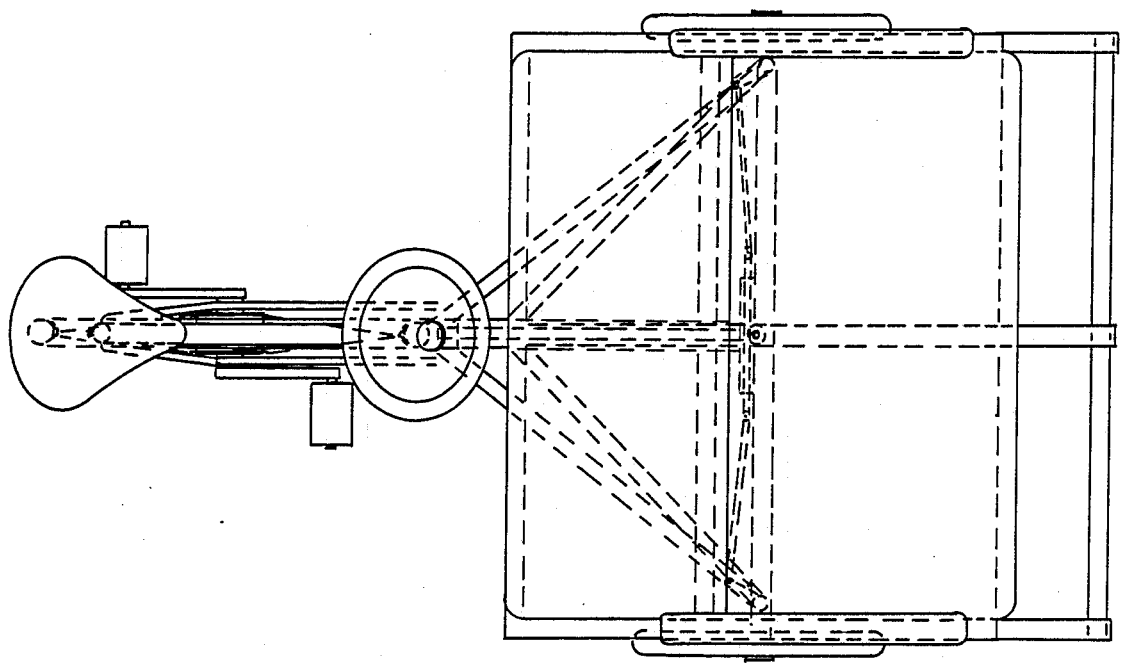
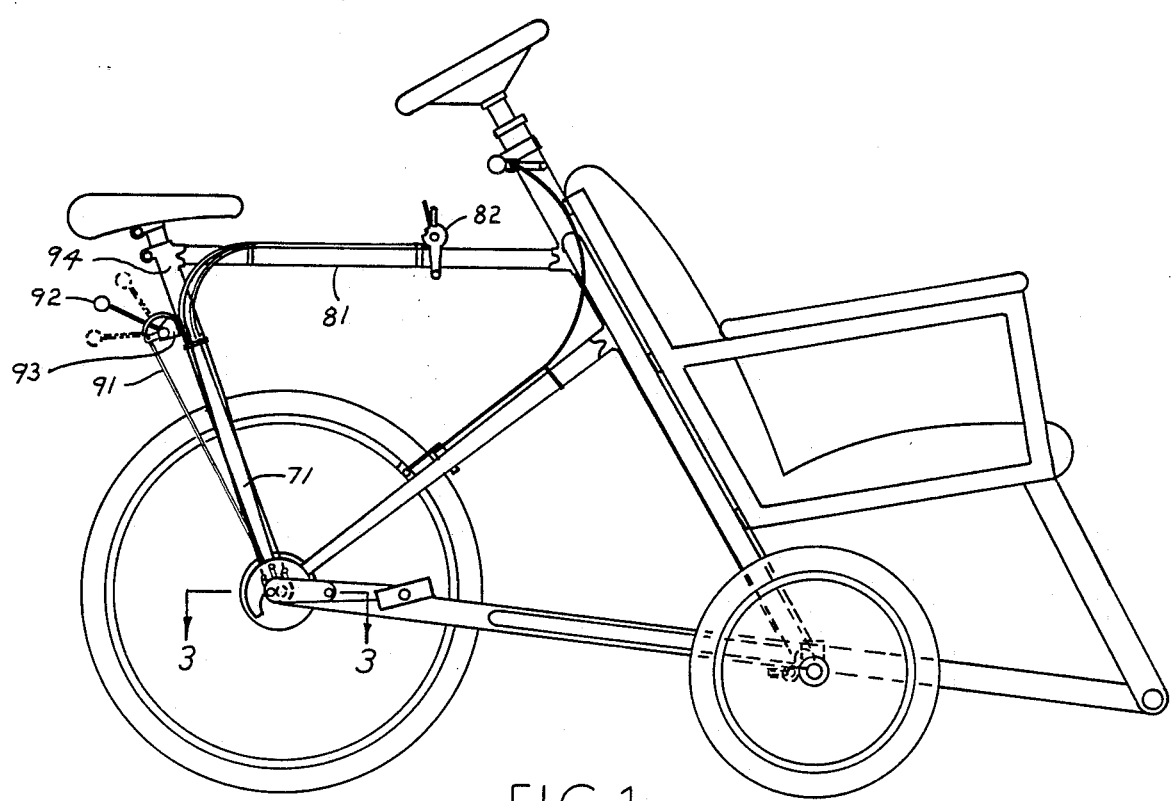
FIG 1

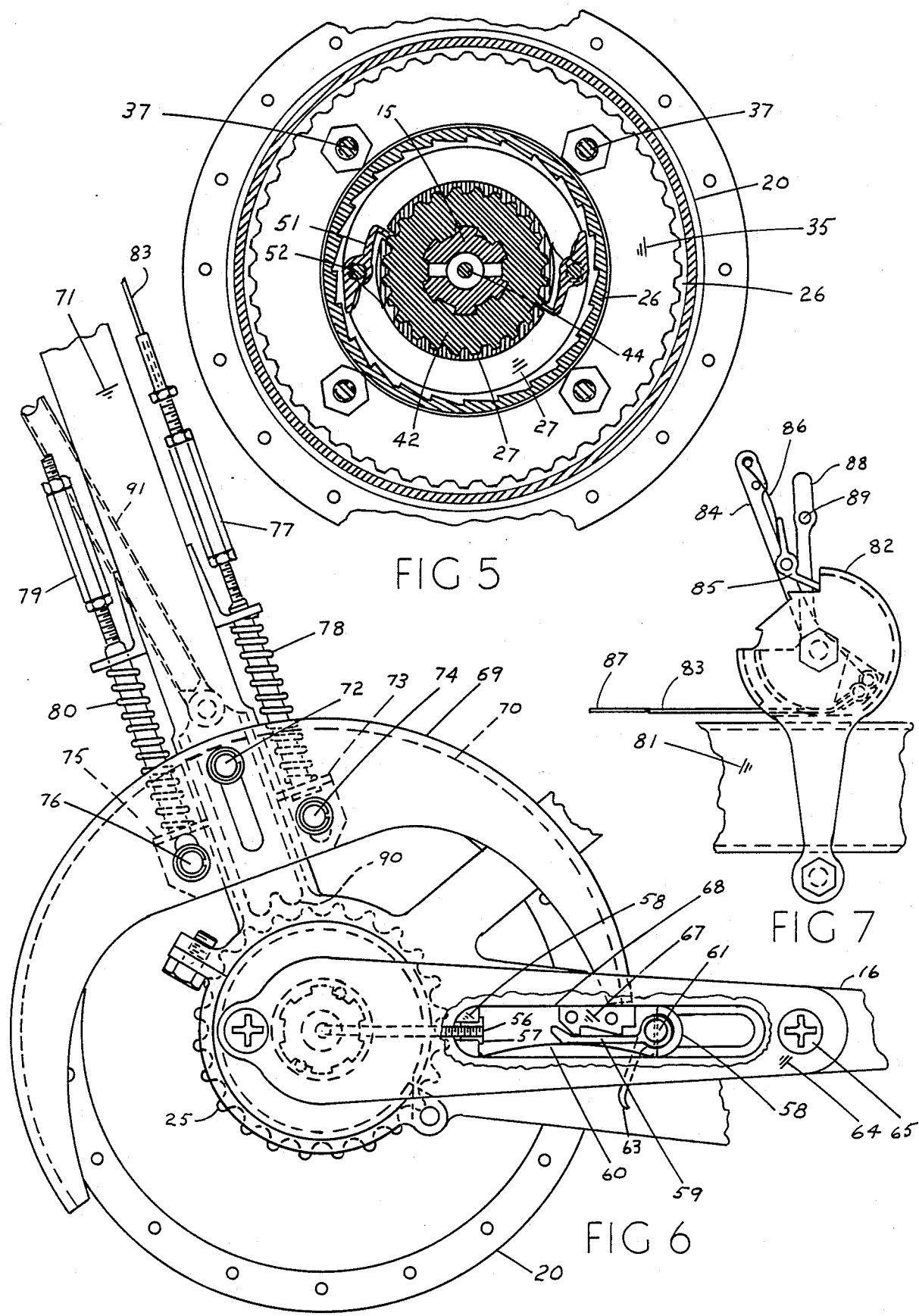

FIVE SPEED CHAINLESS DRIVE FOR HEAVILY LOADED PEDAL POWERED TRICYCLES

BACKGROUND OF THE INVENTION

1. Field of the Invention:

This invention relates generally to transmissions for pedal powered vehicles such as bicycles and tricycles and more particularly to tricycle drive mechanisms of the chainless planetary type.

2. Description of the Prior Art:

The most common multiple speed utility tricycle uses a bottom bracket and a pair of sprockets and chain to drive a three speed planetary transmission which drives one of a pair of rear wheels through an axle. This arrangement provides speed multiplication but the maximum wheel torque is usually a fraction of the pedal torque, and the chain requires periodic cleaning and oiling for efficient operation and to prevent premature chain failure. Chain maintenance is particularly troublesome if the tricycle is used on dirt roads or in dusty areas. The present invention eliminates the maintenance problem and should be particularly useful in the rural areas of developing nations.

SUMMARY OF THE INVENTION

An object of this invention is to provide a low cost, compact, durable, low maintenance multiple speed drive which will provide torque multiplication as well as speed multiplication for pedal powered utility tricycles.

The five speed chainless drive in accordance with the present invention includes a planetary transmission housed within the hub of the driving wheel. The transmission includes a pedal drive shaft rotatably mounted on the axis of the wheel; a ring gear rotatably mounted concentric with the pedal drive shaft with its axial position fixed and with provisions for selectively locking it against rotation; a sun gear rotatably mounted concentric with the pedal drive shaft with its axial position fixed and with provisions for slectively locking it against rotation; a planet gear carrier rotatably mounted concentric with the pedal drive shaft; four equally spaced planet gears rotatably mounted on bearings in the planet gear carrier with each planet gear in constant mesh with both the ring gear and the sun gear; provisions for selectively driving the sun gear, the ring gear, or the planet gear carrier from the pedal drive shaft; a one way clutch driving the wheel hub from the ring gear and a second one way clutch driving the wheel hub from the sun gear with provisions for disengaging the respective clutch when either the ring gear or the sun gear is driven from the pedal drive shaft; and a driving plate for driving the wheel hub in either direction from the planet gear carrier with provisions for disengaging the driving plate from the wheel hub when the planet gear carrier is driven from the pedal drive shaft.

First speed is achieved with the sun gear driven from the pedal drive shaft with the sun gear clutch disengaged, the ring gear locked against rotation, and the planet gear carrier driven the wheel hub.

Second speed is achieved with the ring gear driven from the pedal drive shaft with the ring gear clutch disengaged, the sun gear locked against rotation, and the planet gear carrier driving the wheel hub.

Third speed is achieved with the planet gear carrier driven from the pedal drive shaft with the driving plate disengaged, and both one way clutches driving the wheel hub.

Fourth speed is achieved with the sun gear locked against rotation, the planet gear carrier driven from the pedal drive shaft with the driving plate disengaged, and the ring gear driving the wheel hub through the ring gear clutch.

Fifth speed is achieved with the ring gear locked against rotation, the planet gear carrier driven from the pedal drive shaft with the driving plate disengaged, and the sun gear driving the wheel hub through the sun gear clutch.

The five speed chainless drive of the present invention is used in one embodiment in a rear wheel driven tricycle with front wheel rack and pinion steering, and a forward seat assembly suitable for use as a two passenger taxi. The seat assembly can be replaced with a parts bin or truckbed for transporting parts or produce.

BRIEF DESCRIPTION OF THE DRAWINGS

FIG. 1 is a side elevation view of a tricycle with the five speed drive according to the present invention housed within the rear wheel hub;

FIG. 2 is a plan view of the vehicle shown in FIG .1;

FIG. 5 is a section taken along the line 5—5 of FIG. 3;

FIG. 6 is an enlarged side view of the rear wheel hub shown in FIG. 1; and

FIG. 7 is an enlarged side view of the shift mechanism shown mounted on the top tube in FIG. 1.

DESCRIPTION OF THE PREFERRED EMBODIMENT

Figure 3:
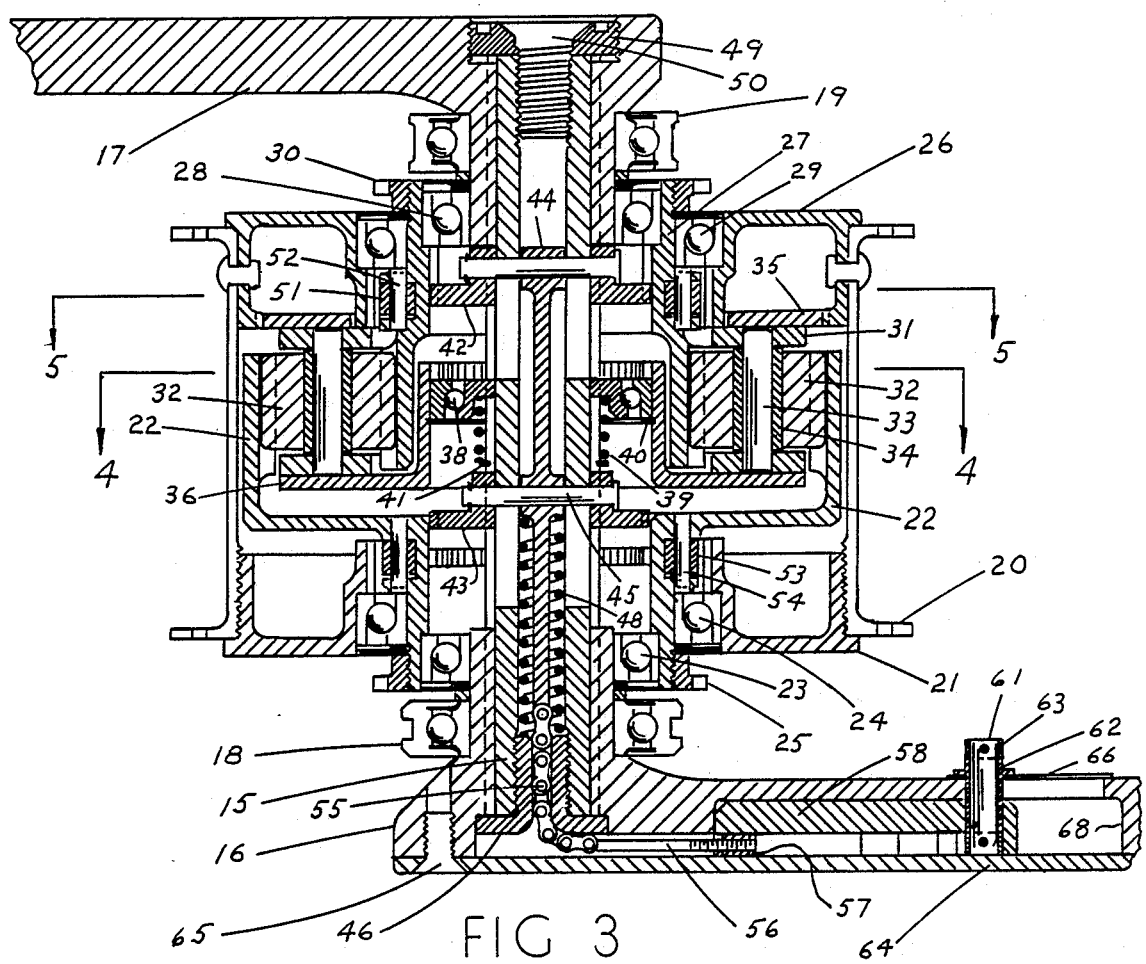
FIG. 3 is an enlarged sectional view taken along the line 3—3 of FIG. 1 with the wheel hub shown separated from the vehicle for clarity.

Referring to FIG. 3, the five speed chainless drive according to the present invention includes a pedal drive shaft 15 located on the axis of the wheel hub 20. the opposite ends of the drive shaft 15 are supported inside inboard cylindrical extensions of the pedal crank arms 16 and 17 by sealed ball bearings 18 and 19 the outer races of which are clamped in rear dropouts on the tricycle frame as shown in FIG. 6. A reduced diameter integral cylindrical extension of a ring gear 22 is rotatably supported by an angular contact ball bearing 23 seated on the cylindrical extension of the right-side pedal crank arm 16. The right-side closing plate 21, which threads into the wheel hub 20 with right-hand threads, is supported by an angular contact ball bearing 24 with its inner race seated on the cylindrical extension of the ring gear 22. The spring loaded dogs 53 of a first one way clutch are mounted in the ring gear 22 on the pins 54 and engage conventional ratchet teeth on the right-side closing plate 21 for driving the closing plate 21 from the ring gear. a locking ring 25, which threads onto the cylindrical extension of the ring gear 22 with left-hand threads, retains the bearing 24 and permits the ring gear 22 to be selectively locked against rotation.

An integral cylindrical extension of a sun gear 27 is supported by an angular contact ball bearing 28 with its inner race seated on the inboard cylindrical extension of the left-side pedal crank arm 17. A left-side closing plate 26, which is rigidly fastened inside the wheel hub 20, is supported by an angular ball bearing 29 with its inner race seated on the extension of the sun gear 27. The spring loaded dogs 51 of a second one way clutch are mounted on the sun gear 27 with the pins 52 and engage conventional ratchet teeth on the closing plate 26 for driving the left-side closing plate 26 from the sun gear 27. A locking ring 30, which threads onto the extension of the sun gear 27 with right-hand hreads, retains the bearing 29 and permits selectively locking the sun gear against rotation.

Figure 4:
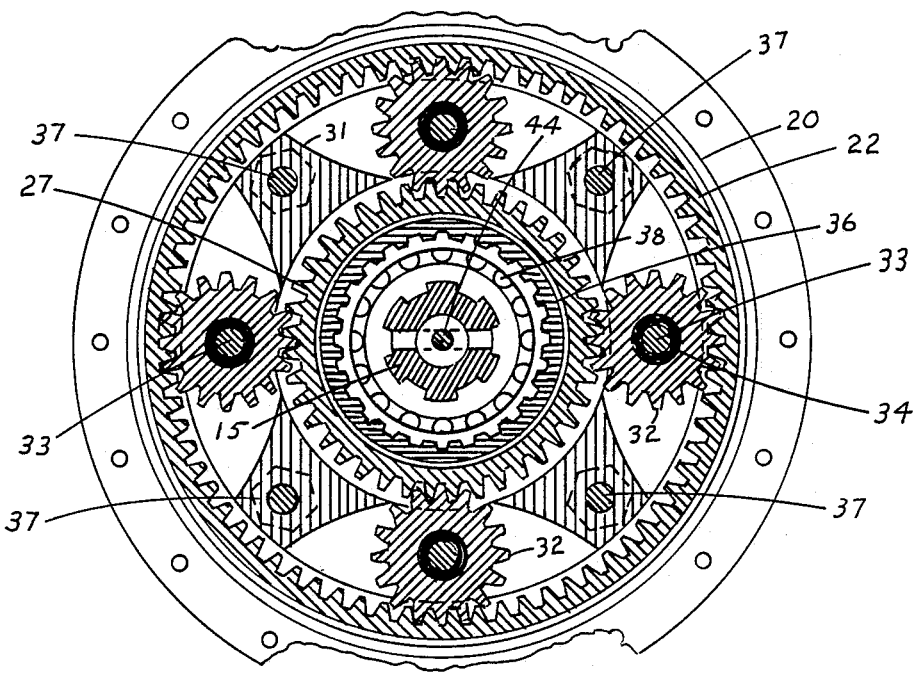
FIG. 4 is a section taken along the line 4—4 of FIG. 3.

Referring to FIGS. 3 and 4, oil-filled sintered bronze bearings 34 are press fit into four planet gears 32 which are mounted in a planet gear carrier 31 on polished steel pins 33. The pins 33 are retained in the carrier 31 by a driving plate 35 and an angle plate 36 which are clamped on opposite sides of the planet gear carrier 31 by four through bolts 37.

As shown in FIG. 3 and 4, spline teeth extend along the entire length of the pedal drive shaft 15 for the transfer of torque from the pedal crank arms 16 and 17 to a pair of drive rings 42 and 43 which are slidably mounted on the drive shaft 15 with internal splines on the drive rings 42 and 43 engaging the external spline on the drive shaft 15. The drive rings 42 and 43 are each connected to a center pin 44 which in installed in a hole through the center of the drive shaft 15, by transverse pins 45 which pass through narrow axial slots in the drive shaft 15. The axial position of the drive rings 42 and 43 is controlled by a compression spring 48 and a small chain 55 which connects the pin 44 with a shift block 58 installed in a milled pocket in the pedal crank arm 16. The compression spring 48 drives the center pin 44 and the pair of transverse pins 45 to the left end of the axial slots in the drive shaft 15. In this position, external teeth on the drive ring 42 engage internal teeth on the sun gear 27 for driving the sun gear from the pedal drive shaft and, as shown in FIG. 5 the external teeth on the drive ring 42 rotate the clutch dogs 51 out of engagement with the ratchet teeth on the closing plate 26, and the closing plate 26 is driven by the planet gear carrier 31 through the driving plate 35.

The axial preload of the four angular contact ball bearings 23, 24, 28, and 29 is adjusted with a thick washer 49 which is threaded into the left-side pedal crank arm 17 and which is clamped against the end of the drive shaft 15 by a flush head screw 50 threaded into one end of the drive shaft 15. The axial preload is reacted by a spanner bolt 46 which is firmly seated against the other end of the drive shaft 15. The angular contact ball bearings maintain the axial position of the ring gear 22, sun gear 27, and wheel hub closing plates 21 and 26.

The axial position of the planet gear carrier 31 is controlled by an angular contact ball bearing 38 the outer race of which is captive between internal teeth on the angle plate 36 and an internal retainer ring 40 installed in the angle plate, and by a compression spring 39 which is installed between the inner race of the bearing 38 and an external retainer ring 41 on the drive shaft 15. The compression spring 39 drives the angle plate 36 to the left forcing the planet gear carrier 31 against the closing plate 26 and maintaining the axial position required for engagement of external teeth on the driving plate 35 with internal teeth on the closing plate 26.

Referring to FIGS. 3 and 6, the chain 55 wraps around an internal radius in the bolt 46 and is connected to a pin 56 which is threaded into a square bushing 57 seated in the block 58. The compression spring 48 pulls the block 58 to the inboard end of the milled pocked 68 in which position the drive ring 42 is located for driving in the sun gear and the drive ring 43 rotates freely with the drive shaft 15. As shown in FIG. 6, a latch 59 and spring 60 can hold the block 58 in either of two outboard positions through engagement of the latch 59 with a latch stop 67 which is riveted to a cover 64 clamped to the crank arm 16 with screws 65. In the inner of these two positions external teeth on the drive ring 43 engage internal teeth on the rear gear 22 and rotate the clutch dogs 53 out of engagement with ratchet teeth on the closing plate 21, and the drive ring 42 is moved out of engagement with the internal teeth on the sun gear 27. In the outer of the two positions, the drive ring 43 is moved out of engagement with the ring gear 22, the external teeth on the drive ring 42 engage internal teeth on the angle plate 36, and the drive ring 42 forces the bearing 38 to the right compressing the spring 39 and moving the driving plate 35 out of engagement with the hub closing plate 26. With the block 58 in this position, the planet gear carrier is driven from the pedal drive shaft 15 and both of the one way clutches are operative.

As shown in FIGS. 3 and 6, a pin 61 which extends through the outboard end of the block 58 provides the means for moving the block 58 to any one of its three required positions through engagement with cams 69 and 70. The latch 59 is riveted on one end of the pin 61, and a latch release 63 is riveted on the other end. A flanged sleeve 62, which is press fit in the block 58, is located between the latch 59 and the latch release 63 with a slot shield 66 located inside the flange of the sleeve 62 to minimize the intrusion of dirt into the crank arm 16.

As shown in FIG. 6, a pin 72 which is welded to the seat fork member 71, extends out through a slot through both cams 69 and 70 with the cams retained on the pin by a washer and snap ring. A pin 74 which is rigidly attached to a cam guide 73, extends out through an elongated hole in the inboard cam 70 and through a tight fitting hole in the outboard cam 69 with the cams retained on the pin with a washer and snap ring. The pin 76 which is rigidly fastened to the cam guide 75, extends out through a tight fitting hole in the inboard cam 70 and through an elongated hole in the outboard cam 69 with the cams retained on the pin 76 with a washer and snap ring. The cam guides 73 and 75 fit under flanges on the seat fork member 71 which prevent outward movement of the guides but permit them to slide axially. Compression springs 78 and 80 drive the guide 73 and 75 down with the downward travel terminated by the upper end of the axial slot bearing on the fixed pin 72. Both cams 69 and 70 are raised with the turnbuckle 77 and cable 83. When the crank arms are rotated with the cams raised, the flanged sleeve 62 comes in contact with the cam 69 and moves the block 58 outward. When both cams are raised with the cable 83, the cam 70 does not contact the latch release 63 which is located inboard of the cam 69 in the plane of the cam 70. But when the cam 70 is raised relative to the cam 69 with the turnbuckle 79 and cable 87, the latch release 63 contacts the cam 70 which rotates the latch 59 out of contact with the latch stop 67 permitting the compression spring 48 (shown in FIG. 3) to lower the block 58 as the cable 87 is lowered.

Referring to FIGS. 1 and 7, a shift assembly 82 is located on the frame top tube 81. The cable 83 is attached to a handle 84 and the cable 87 is attached to a handle 88. When the handle 84 is rotated aft, a semicircular cutout in it engages a pin connecting the cable 87 to the handle 88 and both handles rotate together lifting the cams 69 and 70 with the position of the cams relative to each other unchanged. When the handle 84 is rotated to carry a latch 85, which is mounted on the side of the handle 84, past a first notch in the shift assembly 82, and the crank arms ar rotated to carry the pin 61 over the cams, the latch 59 moves past the first notch in the latch stop 67, and when the handle 84 is released the latch 59 holds the block 58 in the position required for driving the ring gear 22 from the drive shaft. When the crank arms are rotated with the handle 84 rotated aft to carry the latch 85 past a second notch in the shift assembly 82, the latch 59 holds the block 58 in the position required for driving the planet gear carrier from the pedal drive shaft. A spring 86 holds the latch 85 in engagement with the shift assembly 82 until the handle 88 is rotated aft relative to the handle 84 to bring a pin 89, which extends out from the side of the handle 88, up against the latch 85 rotating it back against the spring force. When the crank arms are rotated with the handles 84 and 88 squeezed together, the latch release 63 contacts the cam 70 and rotates the latch 59 out of contact with the latch stop 67 so that when the handles 84 and 88 are rotated forward while still squeezed together and with the pin 61 located near the center of the cams, the block 58 is moved to the inboard end of the milled pocket. When the handle 84 is released in any position, the cams 69 and 70 drop back to a position where neither the sleeve 62 or the latch release 63 contacts them, so that the only purpose of the latch 85 is to indicate the position of the drive rings 42 and 43.

Referring to FIGS. 1 and 6, a strut 91 connects a ring gear locking block 90 which is slidably mounted in a track on the inboard side of the seat fork member 71, to a bell crank fastened on one end of an axle rotatably mounted in a bracket 93 located on the aft side of the seat post 94. A locking handle 92 is rigidly fastened to the center of the axle, and a second bell crank which is oriented 180 degrees from a first bell crank, is fastened on the other end of the axle and is connected by a second strut to a sun gear locking block slidably mounted in a track on the inboard side of opposite seat fork member. The locking handle 92 can be positioned in any one of three notches in a semicircular extension of the bracket 93. With the handle 92 in the center position both the ring gear and the sun gear are free to rotate. With the handle 92 in the forward position the sun gear is locked against rotation and the ring gear rotates freely. With the handle 92 in the aft position the ring gear is locked against rotation and the sun gear rotates freely.

When the sun is driven from the pedal drive shaft with the ring gear locked and the planet gear carrier driving the wheel, the gear ratio is given by $R=n/(n+N)$ where n is the number of the teeth on the sun gear and N is the number of teeth on the ring gear. When the ring gear is driven from the pedal drive shaft with the sun gear locked and the planet gear carrier driving the wheel, the gear ratio is $R=N/(n+N)$. When the planet gear carrier is driven from the pedal drive shaft with both the sun gear and the ring gear free to rotate the drive is direct ($R=1.000$). When the planet gear carrier is driven from the drive shaft with the sun gear locked, and the ring gear driving the wheel, the gear ratio is $R=1+n/N$. When the planet gear carrier is driven from the pedal drive shaft with the ring gear locked and the sun gear driving the wheel, the gear ratio is $R=1+N/n$.

In the example design developed to illustrate the present invention, 20 pitch involute gears are used with a 20 degree pressure angle and 72 teeth for the ring gear, 40 teeth for the sun gear, and 16 teeth for the planet gears. The resultant pitch diameter for the ring gear is 3.6 inches. The gear ratios, equivalent wheel diameter for a 26 inch driving wheel, and speed for a pedal speed of 90 rpm are presented for the example design in the table below.

| GEAR | RATIO | EQUIV. DIA. (INCHES) | MPH |
| --- | --- | --- | --- |
| FIRST | .357 | 9.282 | 2.5 |
| SECOND | .642 | 16.692 | 4.5 |
| THIRD | 1.000 | 26.00 | 7.0 |
| FOURTH | 1.555 | 40.43 | 10.8 |
| FIFTH | 2.80 | 72.80 | 19.5 |

While this invention has been described in terms of a preferred embodiment, it is anticipated that person reading the preceding descriptions and studying the drawings will realize many possible modifications thereof. It is therefore intended that the following appended claims be interpreted as including as such modifications as fall within the true scope and spirit of the present invention.

I claim:

1. In a pedal powered tricycle including a frame, a driving wheel with a central hub, a pedal drive shaft on the axis of said wheel and mounted in bearings in said frame for concentric rotation with said hub, an improved five speed chainless drive located within said hub for concentric rotation therewith and comprising:

An externally toothed sun gear rotatably mounted in a fixed axial position on said pedal drive shaft;

External sun gear locking means operative for selectively locking said sun gear to said frame;

A planet gear carrier rotatably mounted and axially moveable on said pedal drive shaft;

Multiple planet gears rotatably mounted on said planet gear carrier with each of said multiple planet gears in constant mesh with said sun gear;

An internally toothed ring gear rotatably mounted in a fixed axial position on said pedal drive shaft with said ring gear in constant mesh with all of said multiple planet gears;

External ring gear locking means operative for selectively locking said ring gear to said frame;

Drive means operative for alternating during either said sun gear or said ring gear or said planet gear carrier from said pedal drive shaft;

A first one way clutch coupled between said ring gear and said hub for driving said hub from said ring gear with a means for rendering said first one way clutch inoperative through engagement of said drive means with said ring gear;

A second one way clutch coupled between said sun gear and said hub for driving said hub from said sun gear with a means for rendering said second one way clutch inoperative through engagement of said drive means with said sun gear;

A drive plate coupled between said planet gear carrier and said hub for driving said hub from said planet gear carrier with a means for decoupling said hub from said drive plate for independent rotation thereof when said drive means engages said planet gear carrier; and A pair of pedal crank arms fixed on opposite ends of said pedal drive shaft for rotation said outside frame.

2. A five speed chainless drive according to claim 1 wherein said drive means includes splines on said pedal drive shaft; a first drive ring slidably mounted on said pedal drive shaft engaging said splines for rotation therewith; external teeth on said first drive ring for selectively engaging internal teeth on said sun gear or said planet gear carrier; a second drive ring slidably mounted on said pedal drive shaft and engaging said splines for rotation therewith; external teeth on said second drive ring for selectively engaging internal teeth on said ring gear; and a positioning means for selectively adjusting the axial positions of said first and said second drive rings from said tricycle frame.

3. A five speed chainless drive according to claim 1 wherein said fine speed chainless drive includes: a fastening means for fixing said pedal crank arms on the ends of said pedal drive shaft; said fastening means providing axial indexing of said pedal crank arms relative to the ends of said pedal drive shaft; said fastening means for one of said pedal crank arms providing adjustable axial indexing; said pedal crank arms including inboard cylindrical extensions; outboard ball bearings seated on said cylindrical extensions with inner races of said outboard ball bearings engaging shoulders on said crank arms; said outboard ball bearings being adapted to receive and support a portion of said frame; angular contact ball bearings seated on said crank arm cylindrical extensions with inner races of said angular contact ball bearings engaging spacers inside said outboard ball bearings, and outer races seated inside a cylindrical extension of said sun gear on one side of said driving wheel and inside a cylindrical extension of said ring gear on the other side of said driving wheel; an angular contact ball bearing seated outside said sun gear cylindrical extension with its inner race clamped by a sun gear locked ring and its outer race seated inside a wheel hub closing plate; and angular contact ball bearing seated outside said ring gear cylindrical extension with its inner race clamped by a ring gear locking ring and its outer race seated inside a wheel hub closing plate; and with said crank arm fastening means providing an adjustable axial preload for all of said angular contact ball bearings.

4. A five speed chainless drive according to claim 2 wherein said positioning means includes an axial pin located in an axial hole through said pedal drive shaft; a pair of transverse pins located in axial slots through said pedal drive shaft and connecting said axial pin with said first and second drive rings; a compression spring located in said axial hole and driving said pair of transverse pins to one end of said axial slots; a hollow bolt threaded into one end of said pedal drive shaft with the head of said bolt retaining a pedal crank arm; a chain connected to said axial pin passing out through said hollow bolt and wrapping 90 degrees around a radius in said hollow bolt and connecting to a threaded pin located in a slot in said pedal crank arm; the end of said threaded pin captive in a block slidably mounted in a pocket in said pedal crank arm; a sleeve press fit in the outer end of said block; said sleeve extending in through an axial slot in the bottom of said pocket; a pin rotatably mounted in said sleeve with said pin extending past both ends of said sleeve; a latch fixed on the outboard end of said pin and a latch release fixed on its inboard end; a cover attached to said pedal crank arm and enclosing said pocket; a latch stop fastened inside said cover with three latch stop positions coinciding with three axial positions required for said drive rings; a spring forcing said latch against said latch stop; an outer cam for engaging said sleeve and an inner cam for engaging said latch release, said cams being slidably mounted on said frame inside said pedal crank arm; and a pair of cables connecting said cams to shift levers on said frame for positioning said cams.

5. A five speed chainless drive according to claim 1 wherein said sun gear locking means said ring gear locking means includes a sun gear locking block slidably mounted in a track on said frame and aligned in the plane of said sun gear locking ring; a ring gear locking block slidably mounted in a track on said frame and aligned in the plane of said ring gear locking ring; a tooth form on the lower end of said locking blocks matching a tooth form on said locking rings; push rods connecting said locking blocks with bell cranks fastened on opposite ends of an axle rotatably mounted in a bracket fixed on said frame; a locking handle fixed on said axle for rotation therewith; and three notches in said bracket coinciding with three locking handle positions required for sun gear locked, ring gear locked, and both said sun gear and said ring gear free to rotate.

6. A five speed chainless drive according to claim 1 wherein said means for rendering said one way clutches inoperative includes a pair of hub closing plates rigidly fastened inside opposite ends of said hub; ratchet teeth on said hub closing plates; spring loaded clutch pawls mounted on said sun gear and said ring gear engaging said ratchet teeth; protrusions on said clutch pawls extending in through slots in said ring gear and said sun gear in position for engagement with external teeth on a pair of drive rings coupling said ring gear and said sun gear respectively with said pedal drive shaft; and said clutch pawls rotated out of engagement with said ratchet teeth through engagement with said drive rings.

* * * * *